March 9, 1937. C. F. KIECH 2,072,888
METHOD OF AND APPARATUS FOR PROTECTING INSULATING BUSHINGS OF A DEHYDRATOR
Filed March 26, 1934 2 Sheets-Sheet 1
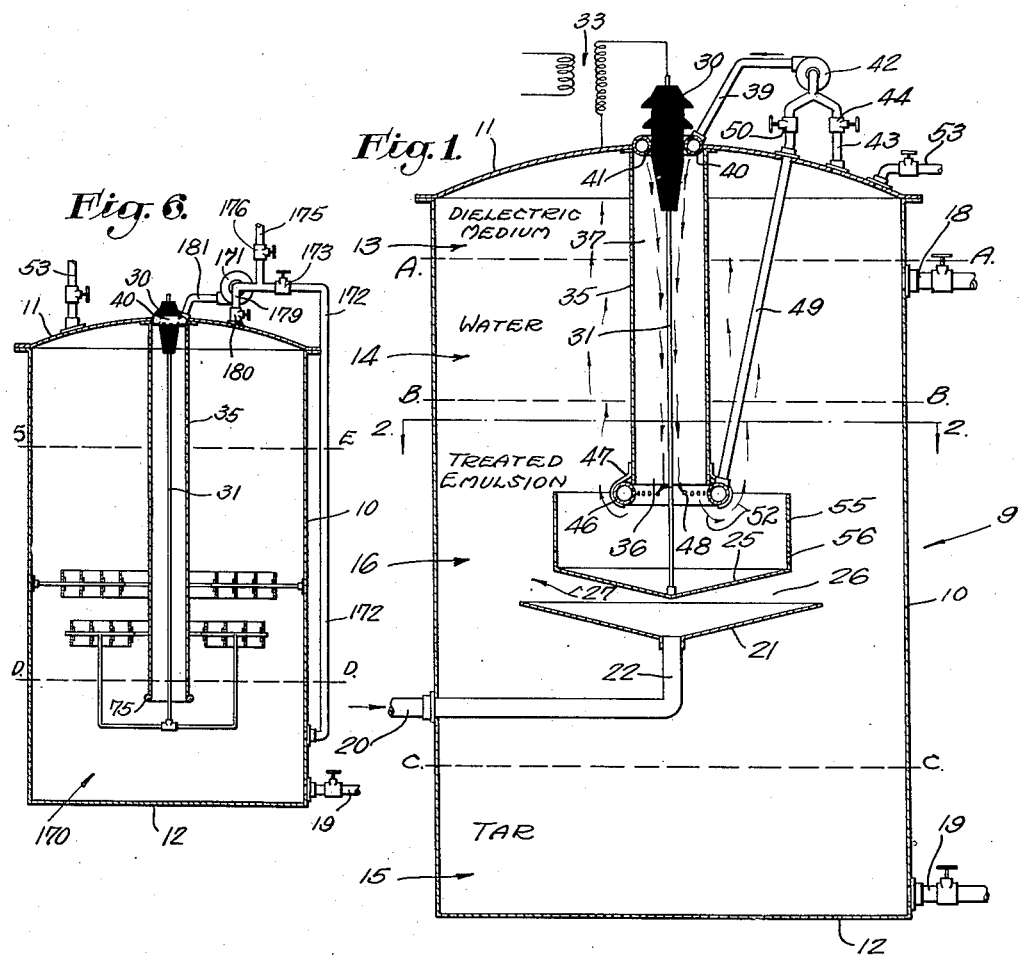
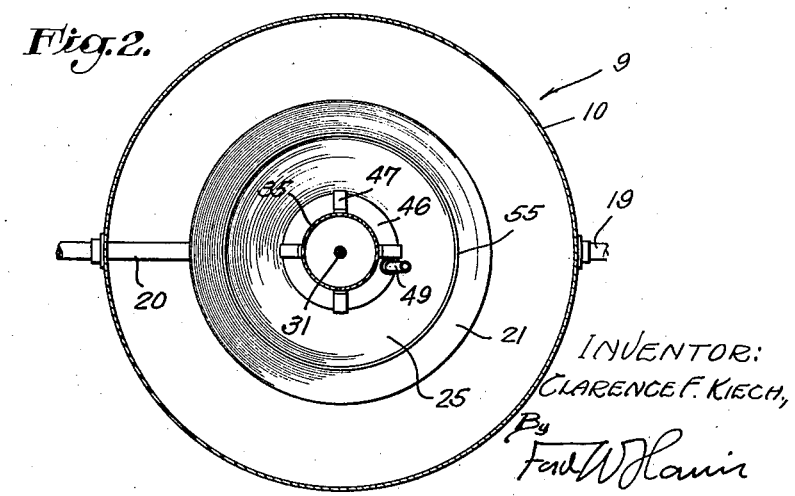
INVENTOR:
CLARENCE F. KIECH,
By
ATTORNEY.

March 9, 1937.　　　　C. F. KIECH　　　　2,072,888
METHOD OF AND APPARATUS FOR PROTECTING INSULATING BUSHINGS OF A DEHYDRATOR
Filed March 26, 1934　　　2 Sheets-Sheet 2
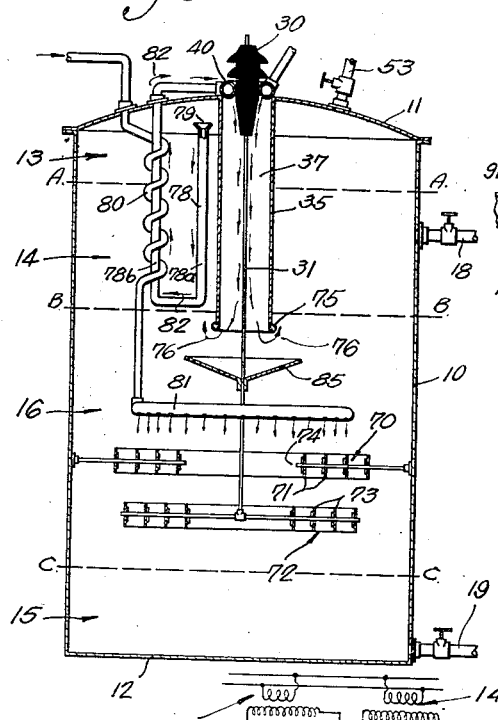
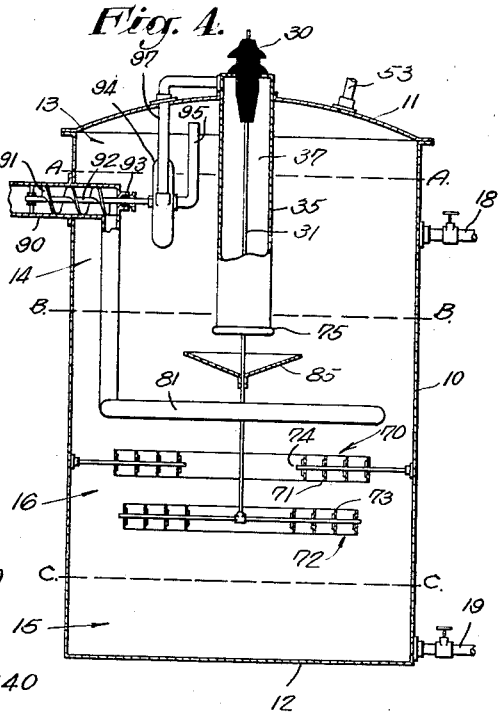
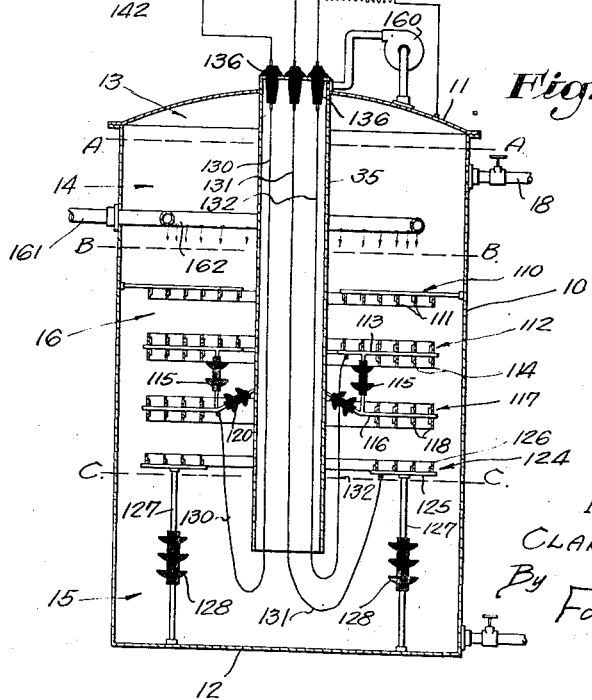
INVENTOR:
CLARENCE F. KIECH,
By
ATTORNEY.

Patented Mar. 9, 1937

2,072,888

UNITED STATES PATENT OFFICE 2,072,888

METHOD OF AND APPARATUS FOR PROTECTING INSULATING BUSHINGS OF A DEHYDRATOR

Clarence F. Kiech, Pasadena, Calif., assignor to Petroleum Rectifying Company of California, Los Angeles, Calif., a corporation of California Application March 26, 1934, Serial No. 717,397

23 Claims. (Cl. 204—24)

My invention relates to the art of electrically treating emulsions to separate the phases thereof, and includes a novel method and apparatus which is particularly applicable to an emulsion one phase of which comprises a conducting liquid and the other phase of which comprises a relatively less conducting liquid, usually a material having a relatively high dielectric strength.

More particularly, the invention relates to a new system for protecting an insulator means in a dehydrator tank whether this insulator means be in the form of an insulating bushing or a string of insulators.

For the purpose of illustration, and without in any way limiting myself thereto, the invention will be particularly described in conjunction with the treatment of tar emulsions such as are produced in the manufacture of artificial gas or in certain by-product coke-ovens, or in similar processes. The invention is particularly applicable to such emulsions, or to any emulsion wherein the material forming the conducting phase is of lower density than the material forming the other phase, but is not limited in utility to such emulsions.

It is an object of the present invention to provide a method and apparatus for introducing high potentials into a tank, such as a dehydrator tank, without danger of contamination of the insulator means to such an extent as to render it inoperative to insulate the high potentials employed.

In the electric dehydration of tar emulsions it is often desirable to separate the emulsion constituents in the same tank that treating takes place. If this method of procedure is followed, the water or aqueous phase, consisting of substantially pure water or a solution of water and organic or inorganic substances or both, will rise to the upper end of the tank and form a body of water, while the tar phase will drop to the lower end of the tank and form a body of tar. These bodies of tar and water will ordinarily be separated by a body of treated emulsion which is undergoing gravitational separation. Thus, a body of conducting liquid is formed in an upper or wet zone in the tank, while a body of liquid of relatively lower conductivity is formed in a lower zone below this upper zone, this lower zone ordinarily containing two more or less distinctly separated bodies of liquid.

It is an object of the present invention to provide a novel method and apparatus wherein the high potentials are introduced through that end of the tank containing the wet zone and wherein the conductor means carrying these high potentials is protected from contact with the body of conducting medium in the wet zone of the tank.

In accomplishing such results I have found it desirable to maintain a stream of a dielectric medium around the conductor means in such a manner as to protect the insulator means, and the provision of such a system is included in the objects of the present invention.

In the preferred embodiment of the invention a downward extending boot is utilized in the upper portion of the tank, this boot extending completely through the body of conducting liquid in the upper end of the tank, and it is an object of the present invention to circulate a dielectric medium in this boot so that the insulator means is at all times protected and kept clean.

It is a further object of the invention to separate from such a stream of dielectric medium any contaminating particles, this being most conveniently done by establishing an electric field inside the boot of sufficient intensity to coalesce these particles into masses of sufficient size to gravitate from the dielectric medium.

It is a further object of the present invention to circulate in such a boot a stream of dielectric medium, at least a portion of this stream being collected at one section of the boot and recycled into the boot at another section.

It is a further object of the invention to maintain a storage zone into which may move at least a portion of the dielectric medium which flows around the insulator means, and to move the dielectric medium in this storage zone into the boot to establish a recirculation system.

A further object of the invention is to provide such a storage zone in the extreme upper end of the tank so that the upper end of the tank contains a body of dielectric medium above the body of conducting medium, and to extend the boot downward from the body of dielectric medium and completely through the body of conducting liquid.

In other instances, however, it is possible to use as a dielectric medium the tar phase which has accumulated in the lower portion of the tank, recycling a portion of this tar in protecting relationship with the insulator means, this construction and method of operation being included in the objects of the present invention.

Further objects of the invention lie in the structures utilized for setting up a flow of dielectric medium in protecting relationship with an insulating means.

Still further objects and advantages of the invention will be made evident to those skilled in the art from the following description.

Referring to the drawings,

Fig. 1 is a vertical sectional view of one form of dehydrator incorporating the features of the present invention.

Fig. 2 is a sectional view taken on the line 2—2 of Fig. 1.

Figs. 3, 4, 5, and 6 illustrate alternative forms of treaters which can be used in performing the methods of the present invention and which illustrate the structural details forming a part of the present invention.

Referring particularly to Fig. 1, I have shown a dehydrator 9 including a tank 10 provided with upper and lower walls 11 and 12. When this dehydrator is in continuous operation, different zones or sections in the tank 10 will contain different liquids. In the form shown in Fig. 1, the extreme upper end of the tank 10 forms a storage zone 13 containing a dielectric medium which may be either a dielectric oil, a dielectric gas, or any other dielectric fluid, the term "fluid" in this connection being used in its broadest sense as including both liquids and gases. This dielectric medium should be relatively immiscible with respect to the conducting phase-liquid of the emulsion. The lower level of this storage zone 13, and the lower level of the dielectric medium, is indicated by the line A—A.

Below the storage zone 13 is a wet zone 14 containing a body of water or other conducting phase-liquid. The extreme lower end of the tank provides a dry zone 15 containing the tar or other phase-liquid of the emulsion which is of relatively poor conductivity. Between the zones 14 and 15 is an intermediate zone 16 which usually contains a body of treated emulsion which is undergoing gravitational separation. In Fig. 1 the line B—B indicates the boundary between the zones 14 and 16, while the line C—C indicates the boundary between the zones 15 and 16. Suitably valved pipes 18 and 19 may be used for respectively withdrawing the water and the tar from the tank 10.

The incoming emulsion flows through a pipe 20 to any suitable electrode structure positioned in the zone 16. In the form shown this electrode structure includes a lower grounded electrode 21 secured to an upward extending portion 22 of the pipe 20, and an upper live electrode 25. In the form shown these electrodes are of conical shape with apices downward and cooperate in defining a treating space 26 into the central portion of which the emulsion is introduced. When an electric field is maintained in this treating space the dispersed particles of the incoming emulsion will be coalesced due to the action of this field, so that when the treated emulsion discharges from the outer portion of the treating space 26, as indicated by the arrow 27, the dispersed phase has been coalesced to a sufficient degree to permit gravitational separation in the zone 16.

In order to energize the live electrode 25, it is of course necessary to introduce high potentials into the tank 10. In the form shown this is accomplished by the provision of an insulator means 30 extending through the top wall 11 of the tank. This insulator means may take the form of an insulating bushing as shown or may merely comprise one or more insulators utilized in supporting or electrically energizing the live electrode 25. As shown, a conductor means 31 is associated with the insulator means 30 and extends downward in the tank to energize the live electrode 25. I have found it preferable to utilize this conductor means for supporting the live electrode, rather than relying upon auxiliary insulators for accomplishing this function. The conductor means 31 may extend completely through the insulator means 30 and may be connected to one high voltage terminal of a transformer 33, the other high voltage terminal of which is grounded to the tank 10 and thus electrically connected to the grounded electrode 21. It will be clear that any suitable source can be used for establishing the electric field in the treating space 26, the transformer 33 being merely one of a large number of potential-supply or potential-controlling means finding utility in the electric treatment of emulsions.

To protect the insulator means 30 and the conductor means 31 from the body of conducting liquid, such as the body of water contained in the zone 14, I provide a boot 35 extending downward in the tank 10 and providing a lower open end 36 which terminates at a section below the wet zone 14. The upper end of this boot may, if desired, be secured to the upper wall 11 of the tank 10 in fluid-tight relationship.

The invention comprehends the provision of a flow of dielectric medium in a chamber 37 defined by the boot. This may be accomplished by introducing the dielectric medium into one portion of the boot and allowing it to flow from another portion thereof. In the form shown the incoming dielectric medium flows through a pipe 39 into an annular discharge means around the insulating means 30, this discharge means being shown in the form of an annular pipe 40 having perforations 41 for discharging the dielectric medium. It is often advantageous to so position the perforations 41 that the incoming dielectric medium washes the outer surface of the insulating means 30. Any means for introducing the dielectric medium into the chamber 37 can be used, though usually it is preferable to introduce this dielectric medium in such a manner as to form an envelope of liquid flowing downward along the insulator means 30.

If desired, dielectric medium may be continuously supplied to the pipe 39 as by a pump 42 driven by any suitable means not shown, this dielectric medium then flowing downward through the boot 35 and being discharged from the lower end thereof. As the dielectric medium is of lower density than any of the emulsion constituents, it will rise from the open lower end 36 of the boot to the storage zone 13 formed above the line A—A in the annular space between the boot 35 and the tank 10. If desired, this dielectric medium may continuously or intermittently be withdrawn from the storage zone 13 so as to maintain the level A—A approximately constant. Preferably, however, this dielectric medium is withdrawn through a pipe 43 providing a valve 44 and communicating with the intake of the pump 42 so that the dielectric medium can be continuously recycled.

If desired, the lower end of the boot 35 may be provided with a withdrawal means for directly withdrawing a portion of the dielectric medium before it is discharged into the space around the boot 35. In the form shown an annular pipe 46 is suitably connected to the lower end of the boot 35 as by being welded thereto or being connected thereto by brackets 47, this pipe providing ports 48 opening on the lower end of the chamber 37. In the preferred operation, a portion, but not necessarily all, of the dielectric medium is withdrawn through the ports 48 and is returned to the intake of the pump 42 through a pipe 49 including a valve 50. If only a portion of the dielectric medium is thus withdrawn through the ports 48, the balance of this dielectric medium will flow downward through the lower open end 36 of the boot 35, as indicated by the arrows 52, and will rise through the zone 16 and 14 until it reaches the storage zone 13. This mode of operation prevents any possibility of an accumulation of water adjacent the lower end of the boot 35 which might tend to form a short-circuiting path between this boot and the conductor means 31. By proper setting of the valves 44 and 50, the pump 42 can be made to withdraw dielectric medium both through the ports 48 and from the storage zone 13. In other instances it is possible to recirculate only that portion of the dielectric medium moving through the ports 48, removing and discarding any excess dielectric medium reaching the storage zone 13. A pipe 53 can be used in this regard. The annular pipe 46 serves another function in that it tends to equalize the electrical stresses adjacent the lower end of the boot 35, rather than allowing these stresses to concentrate adjacent a rather sharp lower edge thereof. Any suitable indicating means, not shown, can be used for indicating to the operator the positions of the levels A—A, B—B, and C—C, and by proper manipulation of the valves shown, these levels can be maintained approximately as shown.

To further prevent any possibility of particles of water or other conducting liquid moving upward in the zone 16 and toward the lower open end of the boot 35, a suitable baffle structure may be provided for guiding the rising water particles from the open end of this boot. This baffle structure may take the form of a conical baffle secured to the conductor means 31 and spaced from the lower end of the boot 35. The live electrode 25 can be made to serve this purpose either with or without a cylindrical baffle 55 secured thereto. As shown, this live electrode is equipped with such a baffle which extends upward to a point just above the lower end of the boot 35. In some instances the upper end of the baffle 55 may terminate a short distance below the lower end of the boot 35. Water particles moving upward in the zone 16 are thus guided from the vicinity of the lower open end of the boot 35. If desired, openings 56 may be provided in the baffle 55 to drain the tar or heavier phase-liquid therefrom. Usually, however, such openings are not necessary if a circulation system is used.

Another feature of this construction is that the dielectric medium flowing through the boot 35 is continuously subjected to a dehydrating action during the operation of the treater. Thus, an electric field is maintained around the conductor means 31, this field being bounded either by the boot 35 acting as a grounded electrode if this boot is made of metal, or by the body of conducting liquid acting as an outer electrode if the boot is made of insulating material. Such an electric field acts to coalesce any contaminating liquid particles which might become associated with the dielectric medium. These conducting particles will be of a density greater than the dielectric medium and will thus drop in the chamber 37. Coalesced particles will be carried out by the stream of dielectric medium moving as indicated by the arrows 52 and will rise in the zone 16 due to the fact that these particles are of lower density than the emulsion in this zone. If a gas is used as a dielectric medium, any contaminating particles will be moved toward one or the other of the electrodes setting up this field in the boot and will collect thereon, dropping to the lower open end of this boot and thus moving into the zone 16. Thus, the dielectric medium is continuously purified by the electric field established around the conductor means 31.

In Fig. 3, I have illustrated an alternative form of the invention including a modified form of circulating means. In this form of the invention the zones 13, 14, 15, and 16 provided, the electrode structure being of somewhat different construction from that shown in Fig. 1. This electrode structure may include a grounded electrode 70 secured to the tank and providing a plurality of concentric rings 71. A live electrode 72 also provides a series of concentric rings 73 preferably out of alignment with the rings 71. The grounded electrode provides a central opening 74 through which the conductor means 31 extends.

In this form no annular pipe 46 need be provided at the lower end of the boot 35, all of the excess dielectric medium supplied to the chamber 37 flowing from the lower end of the boot and rising as indicated by the arrows 76. In many instances, however, it is advisable to use an annular ring 75 at the lower end of this boot to prevent excessive concentration of any electric field formed there adjacent. In this form of the invention it is preferable, although not in all instances necessary, to use a dielectric oil as the dielectric medium, this oil collecting above the level A—A in the storage zone 13.

In order to circulate the dielectric medium, a U-shaped pipe 78 is provided one leg 78a of which carries a funnel 79 and opens on the storage zone 13 above the level A—A. The other leg 78b of this pipe communicates with the annular pipe 40 around the insulating means 30. The leg 78b is jacketed by a coiled pipe 80 through which the incoming emulsion moves, this coiled pipe communicating with an annular spray pipe 81 the perforations of which extend downward so as to introduce the emulsion into the zone 16 in a direction toward the electric field established between the electrodes 70 and 72. The incoming emulsion is always several degrees hotter than the liquid in the dehydrator tank, and this temperature differential is relied upon to thermally circulate the dielectric medium in this form of the invention. Thus, the dielectric medium in the jacketed leg 78b of the U-shaped pipe 78 will be hotter than the liquid in the other leg 78a of this pipe, thus causing a thermal circulation of the dielectric medium, this circulation being indicated by arrows 82. It will be understood that a large flow of dielectric medium is not necessary, it being only desirable to provide a slow flow sufficient to prevent any conducting particles from entering the chamber 37. If desired, a baffle 85 may be provided below the open lower end of the boot 35 to guide any conducting particles from this lower end. So also, if desired, the jacketed leg 78a of the pipe 78, as well as the coiled pipe 80, may be surrounded by a layer of heat-insulating material so as to prevent cooling of the incoming emulsion to such an extent that the desired thermal circulation would not be set up. Usually, however, this is not necessary.

The form of the invention shown in Fig. 4 is similar to that shown in Fig. 3, except for the means for setting up the circulation of the dielectric medium. In this form the incoming emulsion flows through a pipe 90 in which is positioned a turbine screw 91 secured to a rotatable shaft 92 suitably journalled in this pipe. This shaft extends through a stuffing box 93 and into the interior of the dehydrator tank. The incoming emulsion is moved through the pipe 90 under pressure, and this flow of incoming emulsion causes the shaft 92 to rotate. A pump 94 is operatively connected to the shaft 92 and provides an intake pipe 95 communicating with the zone 13 in the upper end of the tank to withdraw dielectric medium therefrom. The discharge of this pump communicates with a pipe 97 which in turn communicates with the chamber 37 inside the boot 35. No annular pipe 40 is shown around the insulating means 30 in this form of the invention, though one can be used, if desired, following the teachings of Fig. 1. The dielectric medium thus moves downward through the chamber 37 and is discharged from the lower end thereof, moving upward in the zones 16 and 14 to the storage zone 13. In this form of the invention dielectric medium may comprise either a liquid or a gas. In the latter instance, the pump 94 will be in the form of a blower.

In this form of the invention the energy required to circulate the dielectric medium is derived from the pump already installed for forcing emulsion into the tank. It will be understood, however, that the invention comprehends the use of any other recirculating system for circulating the dielectric medium through the boot 35.

In the form of the invention shown in Fig. 5 the boot 35 extends downward to a point near the lower end of the tank, and extends below the level C—C so that the open lower end of this boot communicates with the phase-liquid of relatively poor conductivity. The electrode structure shown includes an upper grounded electrode 110 providing a plurality of concentric rings 111. Positioned below this grounded electrode is an auxiliary electrode 112 mounted on a frame 113 and providing concentric rings 114 extending upward and downward therefrom. The frame 113 is supported on strings of insulators 115 which are in turn supported by a frame 116 of another auxiliary electrode 117 which also provides upward and downward extending concentric rings 118. The frame 116 is insulated from the tank by any suitable means. In the form shown strings of insulators 129 are secured to the boot 35 and thus carry the electrodes 112 and 117. Still another auxiliary electrode 124 is positioned below the electrode 117 and comprises a frame 125 with upward extending annular rings 126 thereon. The frame 125 may be supported on rods 127 which are suitably insulated from the tank as by strings of insulators 128.

Such a construction permits the maintenance of electric fields of different magnitude in the treater tank. With such a system I have found it desirable to position a plurality of conductor means inside of the boot 35. Three of these conductor means are shown, indicated respectively by the numerals 130, 131, and 132. These conductor means extend from the lower end of the boot 35 and are respectively connected to the electrodes 117, 124, and 112. Three insulating bushings 136 are provided at the upper end of this boot.

With such an electrode system various electrical hook-ups may be utilized. The particular hook-up shown includes a transformer 140 one terminal of which is grounded to the tank and is thus connected to the electrode 110, the other terminal being connected to the conductor means 122 and thus to the electrode 112. This transformer thus sets up an electric field between the electrodes 110 and 112. Another transformer 142 provides a high-tension winding connected between the conductor means 130, 131, thus setting up an electric field between the electrodes 117 and 124. This field may usually be of greater intensity than the field between the electrodes 110 and 112 due to the fact that a portion of the conducting phase-liquid has already separated from the emulsion before this emulsion enters this high intensity field.

In this form of the invention the dielectric medium is withdrawn from the storage zone 13 as by a pump 160 and is moved into the boot 35, the excess dielectric medium discharging from the lower open end of this boot and flowing upward through the zones 15, 16, and 14 to the storage zone 13. This dielectric medium may be either a gas or a liquid relatively immiscible with the emulsion constituents. In this form of the invention the emulsion flows through a pipe 161 and is discharged from a perforated annular pipe 162 to flow downward into the electric fields.

It is sometimes possible with certain emulsions to use as a dielectric medium the phase-liquid of relatively poor conductivity. Thus, in a tar dehydrator it is sometimes possible to withdraw tar from the lower end of the tank, circulating this tar through the boot 35 in protecting relationship. Such a construction is shown in Fig. 6 in which the lower end of the tank defines a storage chamber 170 in which the tar accumulates, this tar being below the level D—D. The water phase accumulates in the upper end of the tank above the level E—E. A pump 171 is shown including an inlet to which a pipe 172 is connected, this pipe including a valve 173 and extending downward to communicate with the lower end of the tank at a position which is preferably slightly above the pipe 19. The intake of this pump is also shown as communicating with a pipe 175 including a valve 176 and through which a dielectric medium may be pumped when this valve is open. So also the intake of this pump 171 is shown as communicating with a pipe 179 including a valve 180, this pipe opening on the upper end of the tank. The discharge of the pump 171 is connected by a pipe 181 to the interior of the boot 35, this boot being shown as extending to a position below the level D—D, though this is not necessarily the case, as pointed out above.

When a treater such as shown in Fig. 6 is first put into operation it is often desirable to be able to preliminarily introduce a dielectric medium into the boot 35. If desired, this dielectric medium may be of lower density than the water, as previously described. In this instance the valve 176 may be opened, allowing the pump 171 to force a stream of this dielectric medium through the boot 35, this dielectric medium being discharged from the lower end thereof and rising into the extreme upper end of the tank. Once a body of dielectric medium has accumulated in the upper end of the tank, the valve 176 can be closed and the valve 180 opened, in which event the circulating system will be substantially as hereinbefore disclosed. After the dehydrator has come into operation, and a body of tar has been formed in the lower end of the tank, it is entirely possible to close the valve 180 and open the valve 173 so that the pump intakes from the lower end of the tank, circulating tar, or other heavier phase-liquid of sufficient dielectric strength through the boot 35. If the boot is extended below the level D—D, the tar will be discharged from the lower end of the boot 35 directly into the body of tar. If the boot does not extend to the level D—D, the stream of tar will drop downward directly from the lower end of the boot to this body of tar. The tar which is thus drawn into the pump 171 has been already subjected to a settling action so that any sludge will have been separated therefrom, so that no difficulty is encountered due to sludge accumulating around the insulator means in the boot 35. As the treater continues to function, the dielectric material which was preliminarily added can be withdrawn from the upper end of the tank through the pipe 53 or can be maintained in this upper end of the tank as desired. It will be clear that in some instances it is not necessary to supply such a preliminary dielectric medium, especially if the lower end of the tank is preliminarily filled with a body of tar.

If a dielectric oil is used as the dielectric medium, this oil will tend to accumulate in the upper end of the tank above the body of water. It should not be understood, however, that any of the forms of the invention are limited to the use of a dielectric medium which is of lower density than the water. In some instances it is possible to use a dielectric medium which is of even greater density than the tar in which event this dielectric medium will accumulate in the extreme lower end of the tank below the body of tar. The system shown in Fig. 6 can be used for recirculating such a heavy dielectric medium by merely connecting the intake pipe 172 to the extreme lower end of the tank. In this instance it is desirable, although not necessary, that the heavy dielectric medium be relatively immiscible with respect to the tar. As an illustration of a dielectric medium which can be successfully used and which is still somewhat miscible with the tar, it may be desirable to use a relatively thick or viscous tar of almost a semi-solid character. In this event the thick material may move very slowly from the open lower end of the boot 35 and again be almost immediately withdrawn through the pipe 172 by making this pipe of larger diameter than shown in Fig. 6 and extending to withdraw the stream of viscous dielectric almost as soon as it is discharged from the boot. Only the periphery of this stream of viscous dielectric material discharged from the boot will contact the tar, and thus no excessive intermixture between the tar and the di-electric medium will be effected.

It will be noted that in nearly all of the forms of the invention hereinabove described the treater in effect dehydrates or electrically treats two materials at the same time. One of these materials (i. e., the dielectric medium) is electrically treated inside the boot 35, while the other of these materials (i. e., the tar emulsion) is treated in the space between the apron and the tank. Such a simultaneous treatment of dissimilar emulsions may often be used to advantage, as where, for instance, a portion of the recirculated dielectric medium is continuously withdrawn from the recycling path, being supplanted by additional dielectric medium which may conceivably carry foreign particles which it is desired to remove therefrom. Such a dual function of the apparatus is believed to be new regardless of the two materials to be treated.

It will be understood that various modifications may be made in the forms of the invention herein shown without departing from the spirit of the invention. So also, the treaters and methods herein described can be used for treating a wide variety of emulsions, whether or not these emulsions contain tar. While the invention has been particularly described with reference to an emulsion in which the conducting phase is of lower density than the phase of low conductivity, it will be understood that the invention can be used in conjunction with other emulsions in which this relationship does not exist. Thus, if the conducting phase is the heavier phase, the boot may be extended upward from the bottom of the tank in protecting relationship with the insulator means positioned in the bottom of the tank, the open end of the boot then being in the upper end of the tank.

While I have shown the storage zone 13 in the upper end of the tank, it will be understood that in many instances this storage zone may be formed exterior of the tank and made to communicate with the space between the tank and the boot 35. Usually, however, it is simpler to use the upper end of the tank itself in forming this storage zone.

I claim as my invention:

1. In an electric treater, the combination of: a tank; electrode means in said tank for establishing an electric field therein; an insulator means in said tank; an open-ended boot in said tank between said insulator means and said tank, said boot providing a chamber between itself and said insulator means, there being a space in one end of said tank around said boot, said space containing a dielectric medium; and circulation means for setting up a closed circulation of said dielectric medium by continuously withdrawing dielectric medium from said space and introducing same into said chamber, at least a portion of said dielectric medium flowing from the open end of said boot and moving into said space.

2. A combination as defined in claim 1 including means for delivering emulsion to said tank, and in which said last-named circulation means includes a recirculating pump means withdrawing dielectric medium from said space and introducing it into said chamber and includes means responsive to the flow of emulsion to said tank to drive said recirculating pump means.

3. In an electric treater, the combination of: a tank; electrode means in said tank for establishing an electric field therein; insulator means in said tank; a boot in said tank around said insulator means, one end of said boot opening on the space inside said tank; walls defining one or more ports adjacent said one end of said boot and communicating with a chamber defined between said boot and said insulator means; and means for delivering a dielectric medium to said chamber, at least a portion of the dielectric medium in said chamber flowing from said chamber through said ports.

4. In an electric treater, the combination of: a tank; electrode means in said tank for establishing an electric field therein; insulator means in said tank; a boot in said tank around said insulator means, one end of said boot opening on the space inside said tank; walls defining one or more ports adjacent said one end of said boot and communicating with a chamber defined between said boot and said insulator means; means for delivering a dielectric medium to said chamber, at least a portion of the dielectric medium in said chamber flowing from said chamber through said ports; and means for recycling said portion of said dielectric medium moving through said ports into said chamber.

5. In an electric treater, the combination of: a tank; electrode means in said tank for establishing an electric field therein; insulator means in said tank; a boot in said tank around said insulator means, one end of said boot opening on the space inside said tank; walls defining one or more ports adjacent said one end of said boot and communicating with a chamber defined between said boot and said insulator means; means for delivering a dielectric medium to said chamber, at least a portion of the dielectric medium in said chamber flowing from said chamber through said ports, another portion of said dielectric medium flowing from said one end of said boot and collecting in a portion of said tank; and means for withdrawing dielectric medium from said portion of said tank.

6. A combination as defined in claim 5 including recirculating means communicating with said last-named means for recirculating dielectric medium from said portion of said tank into said chamber formed between said insulator means and said boot.

7. In combination with an electric treater for emulsions and providing a tank containing a body of a dielectric material in the upper end thereof, a body of the conducting material forming the dispersed phase of said emulsion therebelow, and a body of the material forming the continuous phase of said emulsion in the bottom of said tank: a boot extending downward from the top of said tank and through said bodies of dielectric material and conducting material and providing a lower end which opens on the interior of said tank at a section below said body of conducting material; conductor means extending downward in said boot and from the lower end thereof; an electrode structure in said tank and energized through said conductor means; an insulator means associated with said conductor means and positioned in said boot; and a dielectric medium in said boot around said insulator means, any excess of said dielectric medium in said boot flowing from said lower end thereof and rising through said body of conducting liquid and into said body of dielectric medium in the upper end of said tank.

8. In combination with an electric treater for emulsions and providing a tank containing a body of a dielectric material in the upper end thereof, a body of the conducting material forming the dispersed phase of said emulsion therebelow, and a body of the material forming the continuous phase of said emulsion in the bottom of said tank: a boot extending downward from the top of said tank and through said bodies of dielectric material and conducting material and providing a lower end which opens on the interior of said tank at a section below said body of conducting material; conductor means extending downward in said boot and from the lower end thereof; an electrode structure in said tank and energized through said conductor means; an insulator means associated with said conductor means and positioned in said boot; and means for supplying an amount of dielectric medium to said boot in excess of the volumetric capacity of said boot whereby a portion of said dielectric medium flows from said lower end of said boot and rises through said body of conducting liquid and into said body of dielectric medium in the upper end of said tank.

9. In combination with an electric treater for emulsions and providing a tank containing a body of a dielectric material in the upper end thereof, a body of the conducting material forming the dispersed phase of said emulsion therebelow, and a body of the material forming the continuous phase of said emulsion in the bottom of said tank: a boot extending downward from the top of said tank and through said bodies of dielectric material and conducting material and providing a lower end which opens on the interior of said tank at a section below said body of conducting material; conductor means extending downward in said boot and from the lower end thereof; an electrode structure in said tank and energized through said conductor means; an insulator means associated with said conductor means and positioned in said boot; means communicating with said body of dielectric medium in said upper end of said tank for introducing dielectric medium into said boot; and a perforated means at the bottom of said boot for withdrawing a portion of said dielectric medium, any excess dielectric medium flowing from said lower end of said boot and rising through said body of conducting liquid and into said body of dielectric medium in the upper end of said tank.

10. A method of introducing high potentials into a dehydrator tank providing a downwardly extending boot therein, which method includes the steps of: maintaining a body of dielectric medium in the top of said tank above the lower end of said boot; maintaining a conducting body of the liquid forming the dispersed phase of said emulsion immediately below said body of dielectric medium and above the lower end of said boot; maintaining below said conducting body a body of emulsion undergoing gravitational settling; maintaining in the bottom of said tank and below said body of emulsion a body of the continuous phase liquid of said emulsion; introducing a high potential into said tank through the space defined by said boot whereby the high potential is insulated from said body of conducting liquid by said boot; and establishing a high potential field in said body of emulsion.

11. A method as defined in claim 10 including the additional steps of, continuously introducing emulsion to be treated into said tank, and withdrawing the conducting liquid of said dispersed phase from said body of conducting liquid and the liquid of said continuous phase from the lower end of said tank at such rates as to maintain the volume of said dielectric medium in said tank substantially constant.

12. A method of introducing high potentials into a dehydrator tank including a boot open at one end, which method includes the steps of: introducing a high potential into said tank through said boot; introducing a dielectric medium into one portion of said boot under sufficient pressure to circulate said dielectric medium through said boot and from said open end thereof; collecting in one end of said tank any excess dielectric medium discharged from said open end of said boot; and recycling dielectric medium from said end of said tank into said boot.

13. In combination with an electric treater for emulsions and providing a tank containing a body of gas in the upper end thereof, a body of the conducting material forming the dispersed phase of said emulsion therebelow, and a body of the material forming the continuous phase of said emulsion in the bottom of said tank: a boot extending downward from the top of said tank and through said body of gas and through said body of conducting material and providing a lower open end which opens on the interior of said tank at a section below said body of conducting material; conductor means extending downward in said boot and from the lower end thereof; an electrode structure in said tank and energized through said conductor means; an insulator means associated with said conductor means and positioned in said boot; and protecting means for said insulator means and including a body of said gas in said boot around said insulator means, any excess of said gas in said boot flowing from the lower end thereof and rising through said body of conducting liquid and into said body of gas in the upper end of said tank.

14. A method of treating an emulsion containing two phase liquids by the use of a tank and an insulator means therein, which method includes the steps of: introducing said emulsion into said tank; establishing an electric field in said tank of sufficient intensity to act upon said emulsion; and moving in washing relationship with said insulator means a stream of dielectric medium dissimilar to and substantially immiscible with either of said phase liquids so as not to be dissolved therein; collecting a body of said insulating medium in one end of said tank; and withdrawing said insulating medium from said one end of said tank and flowing same in washing relationship with said insulator means to form said stream.

15. A method of treating an emulsion containing two phase liquids by the use of a tank containing emulsion and a boot providing an open end communicating with the interior of said tank, which method includes the steps of: introducing a high potential into said tank through said boot; establishing an electric field in said tank by the use of said high potential; continuously introducing a dielectric medium substantially immiscible with either phase liquid of said emulsion into one portion of said boot under sufficient pressure to flow therethrough; continuously moving a stream of said dielectric medium from said open end of said boot and into the emulsion constituents in said tank with sufficient velocity to prevent accumulations of water particles adjacent the lower end of said boot; and separating said dielectric medium from said emulsion constituents, said separation taking place in one end of said tank.

16. A method as defined in claim 10 in which said dielectric medium is dissimilar to either of said phase liquids of said emulsion, and including the step of circulating a stream of said dielectric medium downward through said boot, any excess dielectric medium which flows from the lower end of said boot rising to said body of dielectric medium in the top of said tank.

17. A method of treating an emulsion including a phase liquid of low dielectric strength and a phase liquid of higher dielectric strength by the use of electrode means bounding a treating space and energized by use of an insulator means, which method includes the steps of: establishing an electric field in said treating space of sufficient intensity to coalesce the dispersed phase of said emulsion to produce a body of treated emulsion constituents; collecting said phase liquid of higher dielectric strength in a body at a position at one end of said body of treated emulsion constituents; collecting said phase liquid of low dielectric strength in a body at a position at the other end of said body of treated emulsion constituents; moving a stream of said phase liquid of higher dielectric strength from the collected mass thereof and into washing relationship with said insulator means; and returning said phase liquid of higher dielectric strength moving in washing relationship with said insulator means to said collected mass of this phase liquid through said body of treated emulsion constituents.

18. A method of introducing high potentials into a dehydrator tank including a boot open at one end, which method includes the steps of: introducing a high potential into said tank through said boot; flowing a dielectric medium in a closed circulation path from one end of said tank into one portion of said boot under sufficient pressure to circulate said dielectric medium through said boot and from said open end thereof to return to said one end of said tank; maintaining a body of conducting liquid in said tank in such position that the dielectric medium flows therethrough in returning to said one end of said tank; and electrically treating said dielectric medium flowing in said closed circulation path to purify same.

19. A method of electrically treating an emulsion by the use of a tank and an insulator means, which method includes the steps of: introducing a high potential into said tank by use of said insulator means; establishing an electric field in said tank by use of said high potential; continuously introducing emulsion to be treated into said electric field; continuously withdrawing the emulsion constitutents from said tank; flowing in a closed circulation path in protecting relationship with said insulator means a stream of dielectric medium dissimilar to and substantially immiscible with said emulsion constituents; and establishing another electric field in said tank by use of said high potential and in such position that said dielectric medium flowing in said closed circulation path moves therethrough for purification.

20. In a device for introducing electric current into a tank containing a body of conducting liquid therein, the combination of: a boot extending in said tank from one end thereof through said body of conducting liquid and providing a space between said boot and said tank at said one end of said tank, said space containing a dielectric medium of a density different from said conducting liquid and substantially immiscible therewith; an insulator means in said boot; conductor means associated with said insulator means and extending from one end of said boot; and circulating means for withdrawing said dielectric medium from said space and introducing same into said boot to flow in said boot around said insulator means and from said end of said boot, said dielectric medium then moving through said conducting liquid due to the difference in density of said dielectric medium and said conducting liquid and thus returning to said space.

21. A combination as defined in claim 20 including means for establishing a potential difference between said boot and said conductor means to establish an electric field therebetween acting upon any contaminating particles in said dielectric medium.

22. In an electric treater, the combination of: a tank containing a dielectric medium in a space at one end thereof; an insulator means in said tank; walls forming a chamber around said insulator means; electrode means in said tank; conductor means electrically connected to said electrode means and extending into said chamber to said insulator means; and thermal means for thermally circulating dielectric medium from said space into said chamber and thence to said space to form a closed circulation of said dielectric medium through said chamber.

23. A combination as defined in claim 22 in which said thermal means includes a first conduit for delivering heated emulsion to said tank and a second conduit in heat-transferring relationship with said first conduit to be heated thereby, said second conduit communicating with said dielectric medium and delivering same to said chamber.

CLARENCE F. KIECH.